United States Patent [19]
Kaplan et al.

[11] Patent Number: 5,786,430
[45] Date of Patent: Jul. 28, 1998

[54] THERMOSETTING, POWDER COATING COMPOSITIONS

[75] Inventors: Andreas Kaplan, Chur; Albert Reich, Trin; Rene Gisler, Chur, all of Switzerland

[73] Assignee: EMS-Inventa AG, Zürich, Switzerland

[21] Appl. No.: 962,800

[22] Filed: Nov. 3, 1997

Related U.S. Application Data

[62] Division of Ser. No. 590,291, Jan. 23, 1996, Pat. No. 5,710,221.

[30] Foreign Application Priority Data

Jul. 12, 1995 [DE] Germany .................. 195 25 437.6

[51] Int. Cl.$^6$ .................................................. C08F 20/00
[52] U.S. Cl. ..................... 525/437; 528/296; 528/300; 528/301; 528/302; 528/307; 528/308.6; 525/437; 525/438; 524/81; 427/340; 427/372.2

[58] Field of Search ..................... 528/296, 300, 528/301, 302, 307, 308.6; 525/437, 438; 524/81; 427/340, 372.2

[56] References Cited

FOREIGN PATENT DOCUMENTS

| | | |
|---|---|---|
| 0 121 260 | 3/1984 | European Pat. Off. . |
| 887 543 | 1/1962 | United Kingdom . |
| WO94/04589 | 3/1994 | WIPO . |
| WO95/25762 | 9/1995 | WIPO . |

*Primary Examiner*—Samuel A. Acquah
*Attorney, Agent, or Firm*—Browdy and Neimark

[57] ABSTRACT

Thermosetting powder coating compositions include at least one glycidic-ether containing amorphous and/or semi-crystalline copolyester and a cross-linking agent which is an aliphatic and/or cycloaliphatic polybasic acid and/or its anhydride and/or a polyolmodified anhydride of a polybasic acid and/or amorphous or semi-crystalline carboxyl-functional copolyester resins and/or carboxyl-functional acrylate resins.

17 Claims, No Drawings

5,786,430

1

THERMOSETTING, POWDER COATING COMPOSITIONS

This is a division of application Ser. No. 08/590,291, filed Jan. 23, 1996, now U.S. Pat. No. 5,710,221.

FIELD OF INVENTION

The invention in particular relates to thermosetting powder systems, also called powder coating compositions, with epoxide group-containing amorphous and/or semi-crystalline copolyesters, suitable curing agents and/or pigments and/or fillers and/or additives, wherein the epoxide group-containing amorphous and/or semi-crystalline polyester is one produced by a polymer analogous reaction of hydroxyl-functional copolyesters with epihaloalkanes.

BACKGROUND

In the course of converting mono- or polyvalent monomeric monofunctional or polyfunctional aliphatic or aromatic alcohols with epihaloalkanes, monomeric glycidic ethers are obtained. These compounds are mainly employed as reactive diluents in epoxide coating systems. These epoxide coating systems contain glycidic ether on the basis of bisphenol A as binding agent. The production and use of glycidic ethers and epoxide resins on the basis of bisphenol A is known and described, for example, in the *Handbook of Epoxy Resins* by Lee and Neville, McGraw Hill Book Company, London, 1967.

Hydroxyl-functional copolyesters are a further group of materials having hydroxyl functional groups and are widely known today.

SUMMARY OF INVENTION

It is an object of the invention to make available thermosetting, powder coating compositions on the basis of epoxide group-containing amorphous and/or semicrystalline polyesters. It is a further object to provide a novel and simple process for producing the glycidyl-functional amorphous and/or semi-crystalline copolyesters.

The present invention makes use of the surprising discovery that hydroxyl-functional amorphous and/or semi-crystalline copolyesters can be converted in a polymer-analogous reaction with epihaloalkanes and converted into epoxide group-containing copolyesters and therefore differentiated.

These special glycidic ether groups containing amorphous and/or semi-crystalline copolyesters are particularly suitable as binders for thermosetting powder coating systems.

Therefore thermosetting powder coating systems according to the present invention contain:

(A) at least one glycidic ether-containing amorphous and/or semi-crystalline copolyester, (B) an aliphatic and/or cycloaliphatic polybasic acid and/ or its anhydride and/or a polyol-modified anhydride of a polybasic acid and/or amorphous or semi-crystalline carboxyl functional copolyester resins and/or carboxyl-functional acrylate resins, and (C) if required or optionally, fillers and/or pigments and/or additives, wherein the glycidic ether-containing amorphous and/or semi-crystalline copolyester has a molecular weight (Mn) of 300 to 10,000 and can be obtained by-providing in a first step, an amorphous and/or semi-crystalline copolyester (D) containing hydroxyl groups, which subsequently is converted in further steps by the reaction with epihaloalkanes into an epoxide group-containing copolyester (A).

The amorphous and/or semi-crystalline copolyester (D) can be produced in accordance with condensation processes (esterification and/or transesterification) known for polyesters in accordance with the prior art. If necessary, it is also possible to use suitable catalysts, such as dibutyl stannic oxide or titanium tetrabutylate.

Suitable amorphous hydroxyl-functional copolyester resins have a hydroxyl number of 10 to 200 (mg KOH/g) and a glass transition temperature of >40° C. As acid components, amorphous hydroxyl-functional copolyesters mainly contain aromatic polybasic carboxylic acid, such as terephthalic acid, isophthalic acid, phthalic acid, pyromellitic acid, trimellitic acid, 3,6-dichlorophthalic acid, tetrachloro-phthalic acid and, to the extent available, their anhydrides, chlorides or esters. These amorphous copolyesters mostly contain at least 50 mol % terephthalic acid and/or isophthalic acid, preferably 80 mol %. The remainder of the acids (difference from 100 mol %) consists of aliphatic and/or cycloaliphatic polybasic acids, such as 1,4-cyclohexane dicarboxylic acid, tetrahydrophthalic acid, hexahydro endomethylene terephthalic acid, hexachloro-phthalic acid, azelaic acid, sebacic acid, decane dicarboxylic acid, adipic acid, dodecane dicarboxylic acid, succinic acid, maleic acid and dimeric fatty acids. Hydroxycarboxylic acids and/or lactones, such as 12-hydroxy stearic acid, ε-caprolactone or hydroxy pivalic acid ester of neopentyl glycol, can also be used. Monocarboxylic acids, such as benzoic acid, tertiary butyl benzoic acid, hexahydro benzoic acid and saturated aliphatic monocarboxylic acids are also usable in small amounts.

Aliphatic diols should be mentioned as suitable alcohol components, such as ethylene glycol, 1,3-propanediol, 1,2-propanediol, 1,2-butanediol, 1,3-butanediol, 1,4-butanediol, 2,2-dimethyl propanediol-1,3 (neopentyl glycol), 2,5-hexanediol, 1,6-hexanediol, 2,2-[bis-(4-hydroxycyclo hexyl)] propane, 1,4-dimethylolcyclo hexane, diethylene glycol, dipropylene glycol and 2,2-bis-[4-(2-hydroxyl)] phenyl propane. Polyols are also usable in small amounts, such as glycerine, hexanetriol, pentaerythtriol, sorbitol, trimethylol ethane, trimethylol propane and tris(2-hydroxy) isocyanate. It is also possible to use epoxy compounds in place of diols or polyols. The proportion of neopentyl glycol and/or propylene glycol in the alcohol component preferably is at least 50 mol % in relation to the total acids.

Suitable semi-crystalline polyesters have a hydroxyl number of 10 to 400 (mg KOH/g) and an exactly defined DSC melting point. The semi-crystalline polyesters are condensation products from aliphatic polyols, preferably aliphatic diols, and aliphatic and/or cycloaliphatic and/or aromatic polybasic carboxylic acids, preferably dibasic acids. Examples of aliphatic polyols are: ethylene glycol (1,2-ethane diol), propylene glycol (1,3-propane diol), butylene glycol (1,4-butane diol), 1,6-hexane diol, neopentyl glycol, cyclohexane dimethanol, trimethylol propane, etc. Aliphatic diols are preferred, such as ethylene glycol, butylene glycol and 1,6-hexane diol.

Suitable polybasic carboxylic acids are aliphatic dicarboxylic acids, preferably $C_4$-$C_{20}$-dicarboxylic acids, such as adipic acid, azelaic acid, sebacic acid, dodecane dicarboxylic acid, succinic acid, undecane dicarboxylic acid, and aromatic dicarboxylic acids, such as terephthalic acid, isophthalic acid, phthalic acid and their hydration products, such as 1,4-cyclohexane dicarboxylic acid. Aliphatic dicarboxylic acids with 6 to 12 carbon atoms are preferred. It is of course also possible to employ mixtures of various polyols and polybasic carboxylic acids.

The reaction of the hydroxyl-functional amorphous and/or crystalline copolyesters (D) with epihaloalkanes to from the epoxy group-containing copolyester (A) in accordance with the present invention is performed in the manner customary for producing glycidic ethers.

The glycidic ether from hydroxyl-functional copolyesters is obtained by reacting the hydroxyl functional amorphous and/or semi-crystalline copolyester with an epihaloalkane. As a rule, this reaction takes place in a two-stage process. In the first stage, epihaloalkane is added to the hydroxyl group of the polyester, in the course of which a polyhalohydrin ether is formed. This reaction is catalyzed by Lewis acids, such as boron (III) fluoride, tin (IV) chloride, etc. Inert solvents, such as benzene, toluene, chloroform, etc. are suitable as solvents, or the operation is performed with a surplus of epihaloalkane, which is simultaneously used as a solvent.

The glycidic ether-containing amorphous and/or semi-crystalline copolyester is formed in the subsequent second stage by a dehydrohalogenization reaction in an inert solvent, of which toluene can be cited as an example, with the use of an aqueous lye solution, e.g. a sodium hydroxide solution. The salt solution and water resulting from this reaction, together with the water of the lye solution, form a specifically heavier aqueous waste liquor, which can be easily separated in a simple way from the organic layer after the conversion.

The reaction temperature in the first stage is preferably approximately 80° C. with a reaction time of approximately 30 minutes. The reaction temperature in the second stage is preferably about 50° C. with at a reaction time of approximately 60 minutes.

However, the conversion of the hydroxyl-functional amorphous and/or semi-crystalline copolyester can also take place in a one-stage reaction. This is a phase transfer-catalyzed two-phase reaction between the hydroxyl-functional amorphous and/or semi-crystalline copolyester, epihaloalkane and an aqueous solution, preferably a sodium hydroxide solution. Onium salts, especially quaternary ammonium and/or phosphonium compounds, are employed as phase transfer catalysts, such as benzyl trimethyl ammonium bromide, tetramethyl ammonium bromide, benzyl trimethyl ammonium chloride, ethyl triphenyl phosphonium bromide and butyl triphenyl phosphonium chloride; benzyl trimethyl ammonium bromide is preferred. The reaction temperature is preferably about 60° C. with a reaction temperature of approximately 60 minutes.

The so-called azeotropic process is a variation of the phase transfer process, wherein the water which is present and is generated during the two phase reaction is distilled off azeotropically with the epihaloalkane in a vacuum.

1-chloro-2,3-epoxy propane (epichlorohydrin), 1-chloro-2-methyl-2,3-epoxy propane and 1-chloro-2,3-epoxy butane can be cited as examples of suitable epihaloalkanes. 1-chloro-2,3-epoxy propane is preferred. Other epihaloalkanes can of course also be employed, such as epibromohydrin.

The molecular weights (Mn) of the epoxide group containing amorphous and/or semicrystalline copolyesters are about 300 to about 10,000. The epoxide number of the copolyesters containing epoxide groups in accordance with the present invention lies in the range between 0.018 and 0.510 (equiv./100 g).

Aliphatic polybasic acids, preferably dibasic acids, such as adipic acid, pimelic acid, suberic acid, azelaic acid, sebacic acid, malonic acid, succinic acid, glutaric acid, 1,12-dodecane dioic acid, etc. can be used as the curing agents, components (B). The anhydrides of these acids can also be employed, for example glutaric acid anhydride, succinic acid anhydride, as well as the polyanhydrides of these dicarboxylic acids. The polyanhydrides are obtained by intermolecular condensation of the said aliphatic dibasic dicarbonic acids.

Examples are adipic acid (poly) anhydride, azelaic acid (poly) anhydride, sebacic acid (poly) anhydride, dodecane dioic acid (poly) anhydride, etc. The polyanhydrides have a molecular weight (average weight in relation to the polystyrene standard) of 1,000 to 5,000. The polyanhydrides can also be modified with polyol. The polyanhydrides can also be employed in a mixture with the aliphatic dibasic dicarboxylic acids, which have melting points between 40° and 150° C., for example 12-hydroxy stearic acid, 2- or 3- or 10-hydroxy octadecanic acid, 2-hydroxy myristicic acid.

Cycloaliphatic dicarboxylic acids, such as 1,4- cyclohexane dicarboxylic acid, or their polyanhydrides can also be employed as curing agents.

Amorphous and semi-crystalline carboxyl functional copolyesters are also suitable curing agents. The amorphous as well as the semi-crystalline copolyesters can be produced in accordance with condensation processes (esterification and/or transesterification) known for polyesters in accordance with the prior art. If necessary, it is also possible to use suitable catalysts, such as dibutyl stannic oxide or titanium tetrabutylate.

Suitable amorphous carboxyl-functional copolyester resins have a hydroxyl number of 10 to 200 (mg KOH/g) and a glass transition temperature of >40° C. As acid components, amorphous carboxyl-functional copolyesters mainly contain aromatic polybasic carboxylic acids, such as terephthalic acid, isophthalic acid, phthalic acid, pyromellitic acid, trimellitic acid, 3,6-dichlorophthalic acid, tetrachlorophthalic acid and, to the extent available, their anhydrides, chlorides and esters. They mostly contain at least 50 mol % terephthalic acid and/or isophthalic acid, preferably 80 mol %. The remainder of the acids (difference from 100 mol %) consists of aliphatic and/or cycloaliphatic polybasic acids, such as 1,4-cyclohexane dicarboxylic acid, tetrahydrophthalic acid, hexahydro endomethylene terephthalic acid, hexachloro-phthalic acid, azelaic acid, sebacic acid, decane dicarboxylic acid, adipic acid, dodecane dicarboxylic acid, succinic acid, maleic acid or dimeric fatty acids, hydroxycarboxylic acids and/or lactones, such as 1 2-hydroxy stearic acid, ε-caprolactone or hydroxy pivalic acid ester of neopentyl glycol, can also be used. Monocarboxylic acids, such as benzoic acid, tertiary butyl benzoic acid, hexahydro benzoic acid and saturated aliphatic monocarboxylic acids are also usable in small amounts.

In a preferred form the copolyester contains 0 to 95 mol.-% of cyclohexane dicarboxylic acid and 95 to 0 mol.-% of isophthalic acid combined with neopentylglycol.

Aliphatic diols should be mentioned as suitable alcohol components, such as ethylene glycol, 1,3-propanediol, 1,2-propanediol, 1,2-butanediol, 1,3-butanediol, 1,4-butanediol, 2,2-dimethyl propanediol-1,3(neopentyl glycol), 2,5-hexanediol, 1,6-hexanediol, 2,2-[bis-(4hydroxycyclo hexyl)] propane, 1,4-dimethylolcyclo hexane, diethylene glycol, dipropylene glycol and 2,2-bis-[4-(2-hydroxyl)] phenyl propane. Polyols are also used in small amounts, such as glycerine, hexanetriol, pentaerythtriol, sorbitol, trimethylol ethane, trimethylol propane and tris(2-hydroxy) isocyanate. It is also possible to use epoxy compounds in place of diols or polyols. The proportion of neopentyl glycol and/or propylene glycol in the alcohol component preferably is at least 50 mol % in relation to the total acids.

Suitable semi-crystalline polyesters have an acid number of 10 to 400 (mg KOH/g) and an exactly defined DSC melting point. The semi-crystalline polyesters are condensation products from aliphatic polyols, preferably aliphatic diols, and aliphatic and/or cycloaliphatic and/or aromatic polybasic carboxyric acids, preferably dibasic acids. Examples of aliphatic polyols are: ethylene glycol (1,2-ethane diol), propylene glycol (1,3-propane diol), butylene glycol (1,4-butane diol), 1,6-hexane diol, neopentyl glycol, cyclohexane dimethanol, trimethylol propane, etc. Aliphatic diols are preferred, such as ethylene glycol, butylene glycol and 1,6-hexane diol.

Suitable polybasic carboxylic acids are aliphatic dicarboxylic acids, preferably $C_4$-$C_{20}$-dicarboxylic acids, such as adipic acid, azelaic acid, sebacic acid, dodecane dicarboxylic acid, succinic acid, and undecane dicarboxylic acid; and aromatic dicarboxylic acids, such as terephthalic acid, isophthalic acid, phthalic acid and their hydration products, such as 1,4-cyclohexane dicarboxylic acid. Aliphatic dicarboxylic acids with 6 to 12 carbon atoms are preferred. It is of course also possible to employ mixtures of various polyols and polybasic carboxylic acids.

Suitable carboxyl-functional acrylate polymers have an acid value number of 10 to 300 (mg KOH/g), produced by copolymerization of a mixture of monomers, consisting of a) 0 to 70 parts by weight of methyl(meth)acrylate, b) 0 to 60 parts by weight of (cyclo)alkyl esters of acrylic and/or methacrylic acids with 2 to 18 carbon atoms in the alkyl or cycloalkyl radical, c) 0 to 90 parts by weight of vinyl aromatics, d) 0 to 60 parts by weight of olefinically unsaturated carboxylic acid, wherein the sum of the parts by weight of the components a) to d) is 100.

The monomers b) are preferably (cyclo)alkyl esters of acrylic or methacrylic acid with 2 to 18 carbon atoms in the (cyclo)alkyl radical. Examples of suitable or preferably suitable monomers b) are ethyl(methyl)acrylate, n-propyl (meth)-acrylate, isopropyl(meth)acrylate, n-butyl(meth) acrylate, isobutyl(meth)acrylate, tert.-butyl(meth)acrylate, 2-ethyl hexyl(meth)acrylate, cyclohexyl-methacrylate, neopentyl methacrylate, isobornyl-methacrylate, 3,3,5-trimethyl cyclohexyl methacrylate and stearyl methacrylate.

Styrene, vinyl toluene and a-ethyl styrene, for example, can be considered as monomers c). Examples of d) are acrylic and methacrylic acids, which are also preferably employed, as well as crotonic acid, itaconic acid, fumaric acid, maleic acid and citraconic acid.

Production of the copolymers can take place by copolymerization of the monomers a) to d) cited by way of example in accordance with customary radical polymerization processes, such as solvent, emulsion, bead or substance polymerization. In this case the monomers are copolymerized at temperatures between 60° to 160° C., preferably 80° to 150° C., in the presence of radical-forming agents and possibly molecular weight regulators.

Production of the carboxyl-functional acrylate copolymers takes place in inert solvents. Suitable solvents are, for example, aromatics, such as benzene, toluene, xylene; esters, such as ethyl acetate, butyl acetate, hexyl acetate, heptyl acetate, methylglycol acetate, ethylglycol acetate, methoxypropyl acetate; ethers, such as tetrahydro-furane, dioxane, diethylene glycoldimethyl ether; ketones, such as acetone, methylethyl ketone, methylisobutyl ketone, methyl-n-amyl ketone, methylisoamyl ketone or arbitrary mixtures of such solvents.

The preparation of the copolymers can take place continuously or discontinuously. Customarily the monomer mixture and the initiator are evenly and continuously metered into a polymerizing reactor and the corresponding amount of polymer is simultaneously continuously removed. It is possible to produce copolymers which are preferably chemically almost uniform. It is also possible to produce chemically almost uniform copolymers by letting the reaction mixture run into a stirring vessel at a constant speed without removing the polymer.

It is also possible to introduce a part of the monomers into solvents of the type mentioned above, for example, and to place the remaining monomers and auxiliary agents separately or together into this material at the reaction temperature.

Polymerization generally takes place under atmospheric pressure, but it can also be performed under pressures up to 25 bar. The initiators are employed in amounts between 0.05 to 15 weight-%, relating to the total amount of monomers.

Usual radical starters are suitable initiators, for example aliphatic azo compounds, such as azodiisobutyric nitrile, azo-bis-2-methylvalero nitrile, 1,1'-azo-bis-1-cyclohexane nitrile and 2,2'-azo-bis-isobutyric alkyl ester; symmetrical diacyl peroxides, such as acetyl, propionyl or butyril peroxide, benzoyl peroxides substituted with bromo-, nitro-, methyl- or methoxy groups, lauryl peroxides; symmetrical peroxidicarbonates, for example tert. butylperbenzoate; hydroperoxides, such as tert. butyl hydroperoxide, cumene hydroperoxide; dialkyl peroxides, such as dicumyl peroxide, tert. butylcumyl peroxide or di-tert. butyl peroxide. Conventional regulators can be employed during processing to regulate the molecular weight of the copolymers. Cited as examples are mercaptopropionic acid, tert. dodecyl mercaptan, n-dodecyl mercaptan or diisopropyl xanthogenic disulfide. The regulators can be added in amounts between 0.1 to 10 weight-%, relating to the total amount of monomers.

The solutions of copolymers occurring during copolymerization can then be supplied without further processing to the evaporation or venting process, wherein the solvent is removed, for example in an evaporation extruder or spray dryer at approximately 120° to 160° C. and in a vacuum of 100 to 300 mbar, and the copolymers to be used in accordance with the invention are obtained.

Mixtures of several curing agents can also be used in the thermosetting powder coating systems.

The amounts of anhydrides and acids used as the curing agent—component (B)—in relation to the acrylic resin, can vary over a wide range and depend on the number of epoxide groups in the acrylate resin. Generally a mol ratio of carboxyl groups or anhydride groups to epoxide groups of 0.4 to 1.4:1, preferably of 0.8 to 1.2:1, is selected.

The pigments and/or fillers and/or additives usual for producing and using powder coatings can optionally be present in the coating system in accordance with the present invention. Suitable additives from the group of accelerators, flow control and degassing agents, heat, UV and/or HALS (*hindered amine light stabilizer*) stabilizers and/or triboadditives, as well as matting agents such as waxes, can be used if desired or required.

Production of the powder for coatings in accordance with the present invention preferably takes place in the molten mass by mutual extrusion of all formulation components at temperatures of about 60° to 140° C. The extrudate is subsequently cooled, comminuted and screened to a grain size of less than about 90 mm. Other methods are basically also suitable for producing the powder for coatings, for example mixing of the formulation components in solution and subsequent precipitation or removal of the solvents by distillation.

The application of the powder to substrates to form coatings thereon in accordance with the invention takes place by means of processes usual for providing coatings from powders, for example by means of electrostatic spraying devices (corona or tribo) or in accordance with the fluidized bed method.

The production and properties of the thermosetting powder coating materials in accordance with the invention will be represented by way of non-limiting examples below.

PRODUCTION OF HYDROXYL-FUNCTIONAL COPOLYESTERS

Examples 1 to 4

EXAMPLE 1

501.8 9 (4.82 mol) of neopentyl glycol are placed into a 2-esterification reactor, equipped with a temperature sensor, stirrer, reflux column and distillation bridge, and are melted at 140° C. in a nitrogen atmosphere, which is maintained during the entire reaction. Then 533.3 g (3.21 mol) of isophthalic acid, 138.2 g (0.80 mol) of cyclohexane dicarboxylic acid and 0.6 g of esterification catalyst are added while stirring. After a stepped increase of the interior temperature, the reaction is continued until no more distillate is generated. Condensation is performed in a vacuum of 20 mbar until a melt viscosity of approximately 50 Pa·s at 160° C. is attained.

The polyester obtained has an acid value number of <2 mg KOH/g, a hydroxyl number of 35 mg KOH/g, and an ICI melt viscosity at 160° C. of 45 Pa·s.

The molecular weight, calculated as the average number from the end group concentration, is approximately 2800.

EXAMPLE 2

In a test apparatus analogous to Example 1, 501.8 g (4.82 mol) of neopentyl glycol are provided and melted at 140° C. in a nitrogen atmosphere maintained during the entire reaction. Then 533.3 g (3.21 mol) of isophthalic acid, 138.2 g (0.80 mol) of cyclohexane dicarboxylic acid and 0.6 g of esterification catalyst are then added while stirring. After a stepped increase of the interior temperature, the reaction is continued until no more distillate is generated. Condensation is performed in a vacuum of 20 mbar until a melt viscosity of approximately 15 Pa·s at 160° C. is attained. The polyester obtained has an acid value number of <2 mg KOH/g, a hydroxyl number of 60 mg KOH/g, and an ICI melt viscosity at 160° C. of 14 Pa·s.

The molecular weight, calculated as the average number from the end group concentration, is approximately 1700.

EXAMPLE 3

In a test apparatus analogous to Example 1, 492.0 g (4.72 mol) of neopentyl glycol, 17.5 g (0.28 mol) of ethylene glycol and 5.4 g (0.04 mol) of trimethylol propane are provided and melted at 140° C. in a nitrogen atmosphere maintained during the entire reaction. Then 496.1 g (2.99 mol) of terephthalic acid, 134.1 g (0.81 mol) of isophthalic acid, 29.5 g (0.20 mol) of adipic acid, 7.7 g (0.04 mol) of trimellitic acid anhydride and 0.6 g of esterification catalyst are then added while stirring. After a stepped increase of the interior temperature, the reaction is continued until no more distillate is generated. Condensation is performed in a vacuum of 20 mbar until a melt viscosity of approximately 10 Pa·s at 160° C. is attained.

The polyester obtained has an acid value number of <2 mg KOH/g, a hydroxyl number of 100 mg KOH/g, and an ICI melt viscosity at 160° C. of 8 Pa·s.

The molecular weight, calculated as the average number from the end group concentration, is approximately 1100.

EXAMPLE 4

In a test apparatus analogous to Example 1, 533.1 g (4.51 mol) of hexane diol and melted at 140° C. in a nitrogen atmosphere maintained during the entire reaction. Then 629.3 g (2.73 mol) of dodecane dioic acid and 0.6 g of esterification catalyst are then added while stirring. After a stepped increase of the interior temperature the reaction is continued until no more distillate is generated.

The polyester obtained has an acid value number of <2 mg KOH/g, a hydroxyl number of 199 mg KOH/g, and an ICI melt viscosity at 160° C. of 2 Pa·s.

The molecular weight, calculated as the average number from the end group concentration, is approximately 550.

TABLE 1

Properties: Examples 1 to 4

|  | Example 1 | Example 2 | Example 3 | Example 4 |
|---|---|---|---|---|
| Resin No. | I | II | III | IV |
| OH-No. [mg KOH/g] | 33 | 60 | 100 | 200 |
| Molecular weight (Mn) | 2800 | 1700 | 1100 | 550 |

PRODUCTION OF THE EPOXIDE GROUP-CONTAINING COPOLYESTERS

Examples 5 to 12

EXAMPLE 5

In a heatable 20 liter reactor, provided with a thermometer, stirrer and reflux column, 1697 g of resin no. I are dissolved in 6500 g of toluene. After adding 16 ml of boron (III) fluoride ethyl etherate, the temperature is increased to 80° C. and 100 g epichlorohydrin are added in drops over 1 hour. Subsequently the material is further stirred for 30 minutes at 80° C. and then cooled to 50° C. After the addition of 200 g of an aqueous sodium hydroxide solution (22%), stirring is performed for a further hour at 50° C. Following this the aqueous phase is separated. After vacuum distillation of the organic phase at a temperature of 130° C. at reduced pressure (1 mm Hg), resin no. V is obtained (see Table 2 for properties).

EXAMPLE 6

In a heatable 20 liter reactor, provided with a thermometer, stirrer and reflux column, 934 g of resin no. II are dissolved in 3000 g of toluene. After adding 10 ml of boron (III) fluoride ethyl etherate, the temperature is increased to 80° C. and 100 g epichlorohydrin are added in drops over 1 hour. Subsequently the material is further stirred for 30 minutes at 80° C. and then cooled to 50° C. After the addition of 200 g of an aqueous sodium hydroxide solution (22%), stirring is performed for a further hour at 50° C. Following this the aqueous phase is separated. After vacuum distillation of the organic phase at a temperature of 130° C. at reduced pressure (1 mm Hg), resin no. VI is obtained (see Table 2 for properties).

EXAMPLE 7

In a heatable 20 liter reactor, provided with a thermometer, stirrer and reflux column, 560 g of resin no. III are dissolved in 2000 g of toluene. After adding 16 ml of boron (III) fluoride ethyl etherate, the temperature is increased to 80° C. and 100 g epichlorohydrin are added in drops over 1 hour. Subsequently the material is further stirred for 30 minutes at 80° C. and then cooled to 50° C. After the addition of 200 g of an aqueous sodium hydroxide solution (22%), stirring is performed for a further hour at 50° C. Following this the aqueous phase is separated. After vacuum distillation of the organic phase at a temperature of 130° C. at reduced pressure (1 mm Hg), resin no. VII is obtained (see Table 2 for properties).

EXAMPLE 8

In a heatable 20 liter reactor, provided with a thermometer, stirrer and reflux column, 280 g of resin no. IV are dissolved in 1000 g of toluene. After adding 3 ml of boron (III) fluoride ethyl etherate, the temperature is increased to 80° C. and 100 g epichlorohydrin are added in drops over 1 hour. Subsequently the material is further stirred for 30 minutes at 80° C. and then cooled to 50° C. After the addition of 200 g of an aqueous sodium hydroxide solution (22%), stirring is performed for a further hour at 50° C. Following this the aqueous phase is separated. After vacuum distillation of the organic phase at a temperature of 130° C. at reduced pressure (1 mm Hg), resin no. VIII is obtained (see Table 2 for properties).

EXAMPLE 9

In a heatable 20 liter reactor, provided with a thermometer, stirrer and reflux column, 1697 g of resin no. I are dissolved in 6500 g of toluene and 1000 g of epichlorohydrin at 60° C. After adding 18.6 g of benzyl-trimethyl ammonium chloride, 200 g of an aqueous sodium hydroxide solution (22%) are added and stirring is performed for an hour at 60° C. Then the aqueous phase is separated. After vacuum distillation of the organic phase at a temperature of 130° C. at reduced pressure (1 mm Hg), resin no. IX is obtained (see Table 2 for properties)

EXAMPLE 10

In a heatable 20 liter reactor, provided with a thermometer, stirrer and reflux column, 934 g of resin no. II are dissolved in 3000 g of toluene and 1000 g of epichlorobydrin at 60° C. After adding 18.6 g of benzyl-trimethyl ammonium chloride, 200 g of an aqueous sodium hydroxide solution (22%) are added and stirring is performed for an hour at 60° C. Then the aqueous phase is separated. After vacuum distillation of the organic phase at a temperature of 130° C. at reduced pressure (1 mm Hg), resin no. X is obtained (see Table 2 for properties).

EXAMPLE 11

In a heatable 20 liter reactor, provided with a thermometer, stirrer and reflux column, 560 g of resin no. I are dissolved in 2000 g of toluene and 1000 g of epichlorohydrin at 60° C. After adding 18.6 g of benzyl-trimethyl ammonium chloride, 200 g of an aqueous sodium hydroxide solution (22%) are added and stirring is performed for an hour at 60° C. Then the aqueous phase is separated. After vacuum distillation of the organic phase at a temperature of 130° C. at reduced pressure (1 mm Hg), resin no. XI is obtained (see Table 2 for properties).

EXAMPLE 12

In a treatable 20 liter reactor, provided with a thermometer, stirrer and reflux column, 280 g of resin no. I are dissolved in 1000 g of toluene and 1000 g of epichlorohydrin at 60° C. After adding 18.6 9 of benzyl-trimethyl ammonium chloride, 200 g of an aqueous sodium hydroxide solution (22%) are added and stirring is performed for an hour at 60° C. Then the aqueous phase is separated. After vacuum distillation of the organic phase at a temperature of 130° C. at reduced pressure (1 mm Hg), resin no. XII is obtained (see Table 2 for properties).

TABLE 2

Properties: Examples 5 to 12

|  | Example 5 | Example 6 | Example 7 | Example 8 |
|---|---|---|---|---|
| Resin No. | V | VI | VII | VIII |
| Starting Resin | I | II | III | IV |
| E-No. [Equiv./100 g] | 0.054 | 0.095 | 0.150 | 0.280 |
| Molecular weight (Mn) | 2800 | 1700 | 1100 | 550 |

|  | Example 9 | Example 10 | Example 11 | Example 12 |
|---|---|---|---|---|
| Resin No. | IX | X | XI | XII |
| Starting Resin | I | II | III | IV |
| E-No. [Equiv./100 g] | 0.052 | 0.097 | 0.149 | 0.281 |
| Molecular weight (Mn) | 2800 | 1700 | 1100 | 550 |

PRODUCTION OF THE POWDER COATING MATERIALS

Examples 13 to 22

General Working Formula

The components (see Table 3) are mixed in a Henschel mixer at 700 rpm for 30 sec and subsequently are extruded from a Buss co-kneader (PLK 46) at a barrel temperature of 100° C., cooled screw and screw rotation of 150 rpm. The extrudate is cooled, milled and screened to less than 90 μm.

The resultant powders are electrostatically (corona or tribo) applied as coatings to aluminum sheets (Q-panel AL 36 5005 H 14/08 (0.8mm)) and the coatings are cured at a curing temperature of 200° C. and a baking time of 15 minutes. The film thickness is 60 μm.

TABLE 3

Powder Coating Formulations (in weight-%)

| COMPO-NENTS | Example 13 | Example 14 | Example 15 | Example 16 | Example 17 |
|---|---|---|---|---|---|
| Grilesta P7312* | 25 | 30 | 35 | 40 | 34 |
| Resin No. V | 25 |  |  |  |  |
| Resin No. VI |  | 20 |  |  | 12 |
| Resin No. VII |  |  | 15 |  |  |
| Resin No. VIII |  |  |  | 10 | 4 |

TABLE 3-continued

| Powder Coating Formulations (in weight-%) | | | | | |
|---|---|---|---|---|---|
| TiO$_2$ KRONOS 2160 | 40 | 40 | 40 | 40 | 40 |
| Pv 88[1) | 7 | 7 | 7 | 7 | 7 |
| Benzoin | 3 | 3 | 3 | 3 | 3 |

| COMPO-NENTS | Example 18 | Example 19 | Example 20 | Example 21 | Example 22 |
|---|---|---|---|---|---|
| Grilesta P7312* | 25 | 30 | 35 | 40 | 34 |
| Resin No. IX | 25 | | | | |
| Resin No. X | | 20 | | | 12 |
| Resin No. XI | | | 15 | | |
| Resin No. XII | | | | 10 | 4 |
| TiO$_2$ KRONOS 2160 | 40 | 40 | 40 | 40 | 40 |
| PV 88[1) | 7 | 7 | 7 | 7 | 7 |
| Benzoin | 3 | 3 | 3 | 3 | 3 |

[1)Flow-control agent on polyacrylate basis, a commercial product of Worleé-Chemie GmbH
*Grilesta P7312: Carboxyl-functional Copolyester Acid No.: 33 [mgKOH/g] EMS-CHEMIE AG

TABLE 4 shows the technical coating properties of Examples 13 to 22.

| | Example 13 | Example 14 | Example 15 | Example 16 | Example 17 |
|---|---|---|---|---|---|
| Glass (60° DIN 67530) | 91 | 92 | 91 | 90 | 90 |
| Flow | very good | very good | very good | very good | very good |
| Erichsen Penetration (DIN 53156) [mm] | 10 | 10 | 10 | 10 | 10 |
| Press Cutting (DIN 52151) | 0 | 0 | 0 | 0 | 0 |
| Impact (ASTM D 2794, reverse) | >160 | >160 | >160 | >160 | >160 |

| | Example 18 | Example 19 | Example 20 | Example 21 | Example 22 |
|---|---|---|---|---|---|
| Glass (60° DIN 67530) | 91 | 91 | 90 | 90 | 91 |
| Flow | very good | very good | very good | very good | very good |
| Erichsen Penetration (DIN 53156) [mm] | 10 | 10 | 10 | 10 | 10 |
| Press cutting (DIN 52151) | 0 | 0 | 0 | 0 | 0 |
| Impact (ASTM D 2794, reverse) | >160 | >160 | >160 | >160 | >160 |

What is claimed is:

1. A thermosetting, powder coating composition comprising the following components:

(A) at least one glycidic ether-containing copolyester, which is amorphous, semi-crystalline or a mixture of said amorphous and semi-crystalline copolyesters, said at least one glycidic ether-containing copolyester having a molecular weight (Mn) of 300 to 10,000 and being obtainable by reacting an epihaloalkane with a copolyester containing hydroxyl groups and wherein, said copolyester containing hydroxyl groups is amorphous, semi-crystalline or a mixture of said amorphous and semi-crystalline hydroxyl containing copolyesters;

(B) a curing agent selected from the group consisting of at least one aliphatic polybasic acid, cycloaliphatic polybasic acid, anhydride of said aliphatic polybasis acid, anhydride of said cycloaliphatic polybasic acid, polyol modified anhydride of a polybasic acid, amorphous or semi-crystalline carboxyl functional copolyester resin, carboxyl-functional acrylate resin, and a mixture thereof;

(C) optionally, at least one of a filler, a pigment, another additive, or a mixture thereof.

2. A composition in accordance with claim 1 wherein said copolyester containing hydroxyl groups is an amorphous copolyester having a hydroxyl number of 10–200 (mg KOH/g) and a glass transition temperature greater than 40° C.

3. A composition according to claim 1 wherein said copolyester containing hydroxyl groups is semi-crystalline and has an hydroxyl number between 10 and 400 (mgKOH/g).

4. A coating composition in accordance with claim 1 wherein the epoxide number of the glycidic ether-containing copolyester lies between 0.018 and 0.510 (equiv./100 g).

5. A coating composition in accordance with claim 1 wherein said glycidic ether-containing copolyester is amorphous and contains at least one component selected from the group of terephthalic acid, isophthalic acid, adipic acid, trimellitic acid anhydride, neopentyl glycol, ethylene glycol and trimethylol propane.

6. A coating composition in accordance with claim 1 wherein said glycidic ether-containing copolyester is amorphous and contains 0 to 95 mol % of cyclohexane dicarboxylic acid, 95 to 0 mol % of isophthalic acid and neopentyl glycol.

7. A coating composition in accordance with claim 1 wherein said glycidic ether-containing polyester contains dodecane dicarboxylic acid and hexane diol.

8. A coating composition in accordance with claim 1 wherein component (B) is an amorphous carboxyl-functional copolyester resin having an acid value number of 10 to 200 (mg KOH/g) and a glass transition temperature of >40° C.

9. A coating composition in accordance with claim 1 wherein component (B) is a carboxyl-functional acrylate resin having an acid value number of 10 to 300 (mg KOH/g).

10. A coating composition in accordance with claim 1 wherein component (B) is present in an amount relative to said glycidic ether-containing copolyester (A) of 0.4 to 1.4 carboxyl groups, anhydride groups or both carboxyl and anhydride groups per epoxide group.

11. A coating composition in accordance with claim 1 wherein component (B) is a semicrystalline carboxyl functional copolyester resin with an acid value number of 10 to 400 (mg KOH/g).

12. A coating composition in accordance with claim 1 wherein said epihaloalkane is selected from the group consisting of 1-chloro-2,3-epoxy propane (epichlorohydrin), 1-chloro-2-methyl-2,3-epoxy propane, 1-chloro-2,3-epoxy butane and epibromohydrin.

13. A coating composition in accordance with claim 1 wherein component (B) is present in an amount relative to said glycidic ether-containing copolyester (A) of 0.8 to 1.2 carboxyl groups, anhydride groups or both carboxyl and anhydride groups per epoxide group.

14. A coating composition in accordance with claim 1, wherein said epihaloalkane is 1-chloro-2,3-epoxy propane.

15. A method for producing a powder composition for coating purposes in accordance with claim 1, comprising mixing components (A), (B) and optionally (C), extruding said mixture at a temperature between 60° and 140° C., cooling and comminuting the resultant extrudate, and screening the resultant comminuted particles to a grain size of less than 90 mm.

16. A method of forming a protective coating on a substrate, comprising applying a powder coating composition in accordance with claim 1 to said substrate and fusing said composition to said substrate.

17. A coating composition in accordance with claim 1, comprising comminuted particles having a grain size less than 90 mm obtained from an extruded mixture of components (A), (B) and optionally (C), extruded at a temperature between 60° and 140 Deg. C. and cooled prior to being comminuted.

* * * * *